(12) United States Patent
Ahn

(10) Patent No.: US 12,041,244 B2
(45) Date of Patent: *Jul. 16, 2024

(54) AFFINE MODEL-BASED IMAGE ENCODING/DECODING METHOD AND DEVICE

(71) Applicant: INTELLECTUAL DISCOVERY CO., LTD., Seoul (KR)

(72) Inventor: Yong Jo Ahn, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/098,453

(22) Filed: Jan. 18, 2023

(65) Prior Publication Data

US 2023/0283784 A1    Sep. 7, 2023

Related U.S. Application Data

(63) Continuation of application No. 17/044,765, filed as application No. PCT/KR2019/003932 on Apr. 3, 2019, now Pat. No. 11,595,664.

(30) Foreign Application Priority Data

Apr. 3, 2018 (KR) .................... 10-2018-0038904

(51) Int. Cl.
*H04N 19/159* (2014.01)
*H04N 19/105* (2014.01)
(Continued)

(52) U.S. Cl.
CPC ......... *H04N 19/159* (2014.11); *H04N 19/105* (2014.11); *H04N 19/176* (2014.11); *H04N 19/52* (2014.11); *H04N 19/96* (2014.11)

(58) Field of Classification Search
CPC .. H04N 19/105; H04N 19/117; H04N 19/139; H04N 19/159; H04N 19/176;
(Continued)

(56) References Cited

U.S. PATENT DOCUMENTS 10,560,712 B2    2/2020   Zou et al.
10,582,210 B2    3/2020   Huang
(Continued)

FOREIGN PATENT DOCUMENTS

CN            106537915 A      3/2017
KR      10-2017-0100211 A      9/2017
(Continued)

OTHER PUBLICATIONS

Office Action dated Nov. 8, 2022 issued by China National Intellectual Property Administration in Chinese Application No. 201980023928.2.
(Continued)

*Primary Examiner* — Christopher S Kelley
*Assistant Examiner* — Ana Picon-Feliciano
(74) *Attorney, Agent, or Firm* — Sughrue Mion, PLLC

(57) ABSTRACT

In an image encoding/decoding method and device according to the present invention, a candidate list for motion information prediction of a current block is generated, a control point vector of the current block is derived on the basis of the candidate list and a candidate index, a motion vector of the current block is derived on the basis of the control point vector of the current block, and inter-prediction with respect to the current block can be performed by means of the motion vector.

13 Claims, 6 Drawing Sheets

(51) Int. Cl.
*H04N 19/176* (2014.01)
*H04N 19/52* (2014.01)
*H04N 19/96* (2014.01)

(58) Field of Classification Search
CPC ...... H04N 19/46; H04N 19/513; H04N 19/52; H04N 19/82; H04N 19/96
USPC .................................................. 375/240.16
See application file for complete search history.

(56) References Cited

U.S. PATENT DOCUMENTS

| | | | |
|---|---|---|---|
| 11,595,664 B2* | 2/2023 | Ahn | ............... H04N 19/176 |
| 2017/0214932 A1 | 7/2017 | Huang | |
| 2017/0332095 A1 | 11/2017 | Zou et al. | |
| 2019/0028731 A1 | 1/2019 | Chuang et al. | |
| 2019/0058896 A1 | 2/2019 | Huang et al. | |
| 2019/0124332 A1 | 4/2019 | Lim et al. | |
| 2019/0158870 A1 | 5/2019 | Xu et al. | |
| 2019/0174136 A1* | 6/2019 | Jun | ............... H04N 19/159 |
| 2019/0200040 A1 | 6/2019 | Lim et al. | |
| 2019/0222834 A1 | 7/2019 | Chen et al. | |
| 2019/0289315 A1 | 9/2019 | Hsiao et al. | |
| 2020/0145688 A1 | 5/2020 | Zou et al. | |
| 2020/0162754 A1 | 5/2020 | Huang | |

FOREIGN PATENT DOCUMENTS

| | | |
|---|---|---|
| WO | 2017/118411 A1 | 7/2017 |
| WO | 2017/148345 A1 | 9/2017 |
| WO | 2017/171107 A1 | 10/2017 |

OTHER PUBLICATIONS

International Search Report for PCT/KR2019/003932 dated Jul. 3, 2019 [PCT/ISA/210].
Written Opinion for PCT/KR2019/003932 dated Jul. 3, 2019 [PCT/ISA/237].

* cited by examiner

AFFINE MODEL-BASED IMAGE ENCODING/DECODING METHOD AND DEVICE

CROSS REFERENCE APPLICATIONS

This application is a Continuation application of U.S. application Ser. No. 17/044,765 filed on Oct. 1, 2020, which is a National Stage Entry of International Patent Application No. PCT/KR2019/003932, filed on Apr. 3, 2019, which is based on and claims priority under 35 U.S.C. § 119 to Korean Patent Application No. 10-2018-0038904, filed on Apr. 3, 2018, in the Korean Intellectual Property Office, the disclosures of each of which being incorporated by reference herein in their entireties.

TECHNICAL FIELD

The present invention relates to an image encoding/decoding method and apparatus.

BACKGROUND ART

Recently, demand for high-resolution and high-quality images such as High Definition (HD) images and Ultra High Definition (UHD) images is increasing in various application fields, and accordingly, high-efficiency image compression techniques are being discussed.

For image compression technology, various technologies such as inter prediction technology that predicts pixel value included in the current picture from a picture before or after the current picture using image compression technology, intra prediction technology that predicts pixel value included in the current picture by using pixel information in the current picture, an entropy encoding technology that allocates a short code to a value with a high frequency of appearance and a long code to a value with a low frequency of appearance, exist, and by using such the image compression technology, image data can be effectively compressed and transmitted or stored.

DISCLOSURE

Technical Problem

An object of the present invention is to provide an inter prediction method and apparatus.

An object of the present invention is to provide a prediction method and apparatus based on an affine model.

An object of the present invention is to provide a method and apparatus for motion compensation in units of subblocks.

Technical Solution

The video encoding/decoding method and apparatus according to the present invention may generate a candidate list for motion information prediction of a current block, derive a control point vector of the current block based on the candidate list and a candidate index, derive a motion vector of the current block based on the control point vector of the current block, and perform inter prediction for the current block using the motion vector.

In the video encoding/decoding method and apparatus according to the present invention, the candidate list may include at least one of a plurality of affine candidates or a temporal candidate.

In the video encoding/decoding method and apparatus according to the present invention, the affine candidate may include at least one of a spatial candidate or a constructed candidate.

In the video encoding/decoding method and apparatus according to the present invention, the control point vector of the current block may include at least one of a first control point vector corresponding to an top left sample of the current block, a second control point vector corresponding to a top right sample of the current block, or a third control point vector corresponding to a bottom left sample of the current block.

In the video encoding/decoding method and apparatus according to the present invention, the control point vector of the current block may be derived by considering whether a boundary of the current block is located on a boundary of coding tree block (CTU).

In the video encoding/decoding method and apparatus according to the present invention, the constructed candidate may be determined based on a combination of at least two of the control point vectors corresponding to each corner of the current block.

In the video encoding/decoding method and apparatus according to the present invention, motion information of the temporal candidate may be derived based on motion information of a collocated block corresponding to the current block, and the motion information of the temporal candidate may be derived in units of subblocks of the collocated block.

In the video encoding/decoding method and apparatus according to the present invention, the motion vector of the current block may be derived in units of subblocks of the current block, wherein a motion vector of each subblock of the current block may be derived using at least one of the first control point vector, the second control point vector, the position of the subblock, or the size of the current block.

In the video encoding/decoding method and apparatus according to the present invention, generating the candidate list may be selectively performed by considering at least one of a prediction mode of a neighboring block of the current block or a size of the current block.

Advantageous Effects

According to the present invention, encoding/decoding performance of an image may be improved through prediction based on an affine model.

According to the present invention, prediction accuracy may be improved through motion compensation in units of subblocks.

According to the present invention, the affine model-based predictive encoding/decoding efficiency may be improved by using the optimal affine candidate and temporal candidate.

BEST MODE

Figure 1:
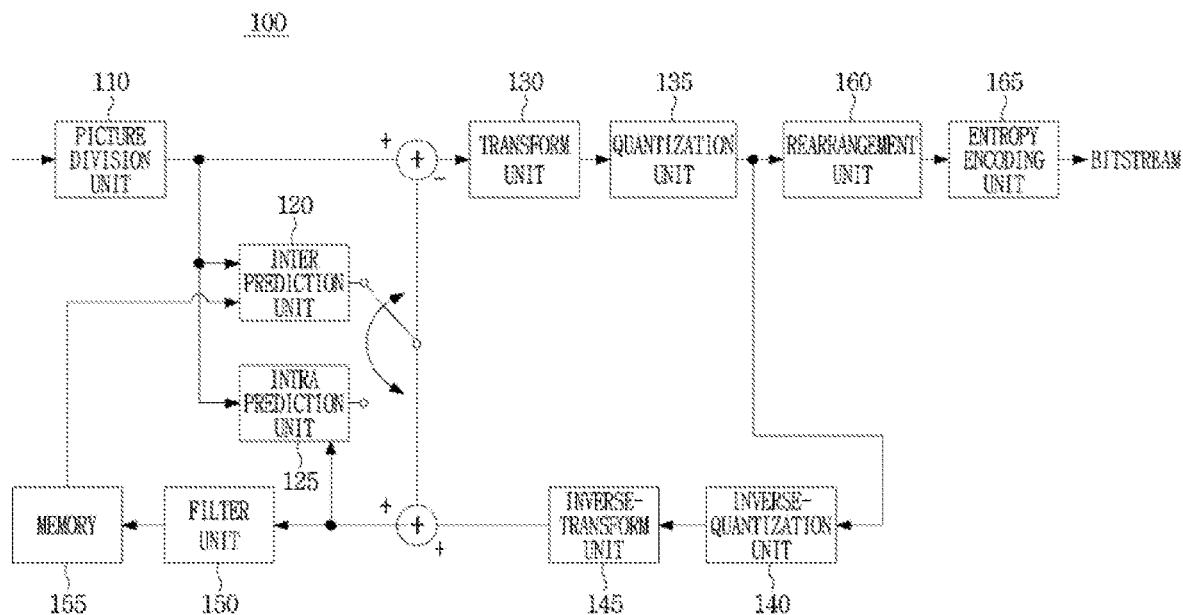
FIG. 1 is a block diagram showing an image encoding apparatus according to the present invention.

The image encoding/decoding method and apparatus according to the present invention may generate a candidate list for motion information prediction of a current block, derive a control point vector of the current block based on the candidate list and a candidate index, derive a motion vector of the current block based on the control point vector of the current block, and perform inter prediction for the current block using the motion vector.

In the image encoding/decoding method and apparatus according to the present invention, the candidate list may include at least one of a plurality of affine candidates or a temporal candidate.

In the image encoding/decoding method and apparatus according to the present invention, the affine candidate may include at least one of a spatial candidate or a constructed candidate.

In the image encoding/decoding method and apparatus according to the present invention, the control point vector of the current block may include at least one of a first control point vector corresponding to an top left sample of the current block, a second control point vector corresponding to a top right sample of the current block, or a third control point vector corresponding to a bottom left sample of the current block.

In the image encoding/decoding method and apparatus according to the present invention, the control point vector of the current block may be derived by considering whether a boundary of the current block is located on a boundary of coding tree block (CTU).

In the image encoding/decoding method and apparatus according to the present invention, the constructed candidate may be determined based on a combination of at least two of the control point vectors corresponding to each corner of the current block.

In the image encoding/decoding method and apparatus according to the present invention, motion information of the temporal candidate may be derived based on motion information of a collocated block corresponding to the current block, and the motion information of the temporal candidate may be derived in units of subblocks of the collocated block.

In the image encoding/decoding method and apparatus according to the present invention, the motion vector of the current block may be derived in units of subblocks of the current block, wherein a motion vector of each subblock of the current block may be derived using at least one of the first control point vector, the second control point vector, the position of the subblock, or the size of the current block.

In the image encoding/decoding method and apparatus according to the present invention, generating the candidate list may be selectively performed by considering at least one of a prediction mode of a neighboring block of the current block or a size of the current block.

MODE FOR INVENTION

Hereinafter, embodiments of the present invention will be described in detail with reference to the drawings attached thereto, so that those skilled in the art may easily carry out the present invention. The present invention may, however, be embodied in many different forms and should not be construed as limited to the embodiments set forth herein. In order to clearly illustrate the present invention, parts not related to the description are omitted, and similar parts are denoted by like reference characters throughout the specification.

Throughout this specification, when a part is referred to as being 'connected' to another part, it includes not only an example where they are directly connected but also an example where the part is electrically connected with another part in between.

In addition, when a part is referred to as 'comprising' an element throughout the specification, it is understood that the element may include other elements as well, without departing from the other elements unless specifically stated otherwise.

In addition, the terms first, second, etc. may be used to describe various components, but the components should not be limited by the terms. The terms are used only for the purpose of distinguishing one component from another.

In addition, in the embodiments of the apparatus and method described herein, some of the components of the apparatus or some of the steps of the method may be omitted. In addition, the order of some of the components of the apparatus or the order of some of the steps of the method may be changed. In addition, other components or other steps may be inserted in some of the components of the apparatus or in some of the steps of the method.

In addition, some of the components or steps of the first embodiment of the present invention may be added to the second embodiment of the present invention, or may replace some of the components or steps of the second embodiment.

In addition, the components shown in the embodiments of the present invention are shown independently to indicate different characteristic functions, and do not mean that each component is composed of separate hardware or one software component unit. That is, for convenience of description, each component is listed as each component, and at least two components of each component may be combined to form one component, or one component may be divided into a plurality of components to perform a function. The integrated and separated embodiments of each of these components are also included in the scope of the present invention without departing from the essence of the present invention.

First, the terms used in the present application will be briefly described as follows.

The decoding apparatus (Video Decoding Apparatus), which will be described later, may be a civil security camera, a civil security system, a military security camera, a military security system, a personal computer (PC), a notebook computer, a portable multimedia player (PMP), a wireless communication terminal, a smart phone, a apparatus included in a server terminal such as a TV application server and a service server, and may mean a user terminal such as various apparatus, a communication apparatus such as a communication modem for performing communication with a wired/wireless communication network, a memory for storing various programs and data for decoding an image or performing an inter prediction or intra prediction for decoding, various apparatus equipped with microprocessor, etc. for executing programs and calculating and controlling them.

In addition, an image encoded as a bitstream by an encoder may be transmitted to an image decoding apparatus through real-time or non-real-time wired/wireless communication networks such as the Internet, local area wireless communication networks, wireless LAN networks, WiBro networks, mobile communication networks, or through various communication interfaces such as cables, Universal Serial Bus (USB), etc., decoded, reconstructed as an image, and reproduced. Alternatively, the bitstream generated by the encoder may be stored in memory. The memory may include both volatile memory and non-volatile memory. In the present specification, the memory may be represented as a recording medium storing the bitstream.

In general, a video may be composed of a series of pictures, and each picture may be divided into a coding unit such as a block. In addition, a person with ordinary knowledge in the technical field to which this embodiment belongs may understand that the term 'a picture' described below may be used by replacing it with another term having an equivalent meaning such as 'an image' or 'a frame'. In addition, it will be understood by those of ordinary skill in the art to which this embodiment pertains that the term 'a coding unit' may be substituted for and used with other terms having the same meaning, such as 'a unit block' and 'a block'.

Hereinafter, exemplary embodiments of the present invention will be described in detail with reference to the accompanying drawings. In describing the present invention, redundant description of the same components will be omitted.

FIG. 1 is a block diagram showing an image encoding apparatus according to the present invention.

Referring to FIG. 1, the conventional image encoding apparatus 100 includes a picture division unit 110, a prediction unit 120, 125, a transform unit 130, a quantization unit 135, a rearrangement unit 160, and an entropy encoding unit 165, an inverse quantization unit 140, an inverse transform unit 145, a filter unit 150, and a memory 155.

The picture division unit 110 may divide the input picture into at least one processing unit. In this case, the processing unit may be a prediction unit (PU), a transform unit (TU), or a coding unit (CU). Hereinafter, in an embodiment of the present invention, a coding unit may be used as a meaning of a unit that performs encoding, or may be used as a meaning of a unit that performs decoding.

The prediction unit may be obtained by dividing one coding unit into at least one square or non-square shape of the same size. One coding unit may be divided such that one prediction unit of prediction units has a different shape and/or size from another prediction unit. When a prediction unit that performs intra prediction based on a coding unit is not a minimum coding unit, intra prediction may be performed without dividing into a plurality of N×N prediction units.

The prediction units 120 and 125 may include an inter prediction unit 120 that performs inter prediction, and an intra prediction unit 125 that performs intra prediction. Whether to use inter prediction or intra prediction for a prediction unit may be determined, and specific information (e.g., intra prediction mode, motion vector, reference picture, etc.) according to each prediction method may be determined. The residual value (residual block) between the generated prediction block and the original block may be input to the transform unit 130. In addition, prediction mode information, motion vector information, and the like used for prediction may be encoded by the entropy encoding unit 165 together with the residual value and transmitted to the decoder. However, when the motion information derivation method of the decoder side according to the present invention is applied, the corresponding information is not transmitted to the decoder because the prediction mode information, motion vector information, and the like are not generated in the encoder. On the other hand, information indicating that the motion information is derived and used in the decoder side and information on a method used to derive the motion information may be signaled from the encoder.

The inter prediction unit 120 may predict a prediction unit based on information of at least one of a previous picture or a subsequent picture of the current picture, and in some cases, predict a prediction unit based on information of some regions, which encoding has been completed, in the current picture. The inter prediction unit 120 may include a reference picture interpolation unit, a motion prediction unit, and a motion compensation unit.

The reference picture interpolation unit may receive reference picture information from the memory 155 and generate pixel information of an integer pixel or less in the reference picture. In the case of a luma pixel, a DCT-based 8-tap interpolation filter (DCT-based interpolation filter) having different filter coefficients may be used to generate pixel information of an integer pixel or less in units of a ¼ pixels. In case of a chroma signal, a DCT-based 4-tap interpolation filter (DCT-based interpolation filter) having different filter coefficients may be used to generate pixel information of an integer pixel or less in units of ⅛ pixels.

The motion prediction unit may perform motion prediction based on the reference picture interpolated by the reference picture interpolation unit. As a method for calculating the motion vector, various methods such as Full Search-based Block Matching Algorithm (FBMA), Three Step Search (TSS), and New Three-Step Search Algorithm (NTS) may be used. The motion vector may have a motion vector value in units of ½ or ¼ pixels based on the interpolated pixels. The motion prediction unit may predict a current prediction unit by differently using a motion prediction method. Various methods such as a skip method, a merge method, an AMVP (Advanced Motion Vector Prediction) method, and an intra block copy method may be used as the motion prediction method. In addition, when applying the motion information derivation method of the decoder side according to the present invention, a template matching method and a bidirectional matching (bilateral matching) method using a motion trajectory may be applied as methods performed by the motion prediction unit. In relation, the template matching method and the bidirectional matching method will be described later in detail in FIG. 3.

The intra prediction unit 125 may generate a prediction unit based on reference pixel information around a current block, which is pixel information in a current picture. When the neighboring block of the current prediction unit is a block that performs inter prediction and the reference pixel is a pixel that performs inter prediction, the reference pixel included in the block that performs inter prediction may be used by replacing it with reference pixel information of a block that performs intra prediction around it. That is, when the reference pixel is not available, the unavailable reference pixel information may be used by replacing with at least one reference pixel among the available reference pixels.

In addition, a residual block including residual information that is a difference value between the prediction unit that performs prediction based on the prediction units generated by the prediction units 120 and 125 and the original block of the prediction unit may be generated. The generated residual block may be input to the transform unit 130.

The transform unit 130 may transform a residual block including residual information between a prediction unit generated by the prediction units 120 and 125 and the original block by using the transform method such as DCT (Discrete Cosine Transform), DST (Discrete Sine Transform), and KLT. Whether DCT, DST, or KLT is applied to transform the residual block may be determined based on intra prediction mode information of a prediction unit used to generate the residual block.

The quantization unit 135 may quantize values transformed to the frequency domain by the transform unit 130. The quantization coefficient may vary depending on the block or the importance of the image. The value calculated by the quantization unit 135 may be provided to the inverse quantization unit 140 and the rearrangement unit 160.

The rearrangement unit 160 may perform the rearrangement of the coefficient value for the quantized residual value.

The rearrangement unit 160 may change coefficients of 2-dimensional block form into 1-dimensional vector form through a coefficient scanning method. For example, the rearrangement unit 160 may change into a 1-dimensional vector form by scanning from a DC coefficient to a coefficient in a high frequency region according to a Zig-Zag Scan method. Depending on the size of the transform unit and the intra prediction mode, a vertical scan of scanning coefficients of two-dimensional block form in a column direction and a horizontal scan of scanning coefficients of two-dimensional block form in a row direction may be used instead of a zig-zag scan. That is, depending on the size of the transform unit and the intra prediction mode, it may be determined which one of a zigzag scan, a vertical scan, and a horizontal scan is used.

The entropy encoding unit 165 may perform entropy-encoding based on values calculated by the rearrangement unit 160. Various encoding methods, such as exponential Golomb, CAVLC (Context-Adaptive Variable Length Coding), and CABAC (Context-Adaptive Binary Arithmetic Coding), may be used for entropy-encoding. In relation to this, the entropy encoding unit 165 may encode residual value coefficient information of a coding unit from the rearrangement unit 160 and the prediction units 120 and 125. In addition, according to the present invention, information indicating that the motion information is derived and used in the decoder side and information on a method used to derive the motion information may be signaled from the encoder.

The inverse quantization unit 140 and the inverse transform unit 145 inverse-quantize the values quantized by the quantization unit 135 and inverse-transform the values transformed by the transform unit 130. The reconstructed block may be generated by combining the residual value generated by the inverse quantization unit 140 and the inverse transform unit 145 with the prediction unit predicted through the motion estimation unit, the motion compensation unit, and the intra prediction unit included in the prediction units 120 and 125.

The filter unit 150 may include at least one of a deblocking filter, an offset correction unit, and an adaptive loop filter (ALF). The deblocking filter may remove block distortion caused by boundary between blocks in the reconstructed picture. The offset correction unit may correct an offset from the original image in units of pixels for the deblocking-filtered image. In order to perform offset correction for a specific picture, after classifying the pixels included in the image into a certain number of regions and determining the region to which the offset is applied, a method of applying the offset to the region offset or a method of applying the offset by considering edge information of each pixel may be used. ALF (Adaptive Loop Filtering) may be performed based on a value obtained by comparing a filtered reconstructed image with an original image. After classifying the pixels included in the image into a predetermined group, one filter to be applied to the group may be determined to perform filtering differently for each group.

The memory 155 may store the reconstructed block or picture output from the filter unit 150, and the stored reconstructed block or picture may be provided to the prediction units 120 and 125 when performing inter prediction.

Figure 2:
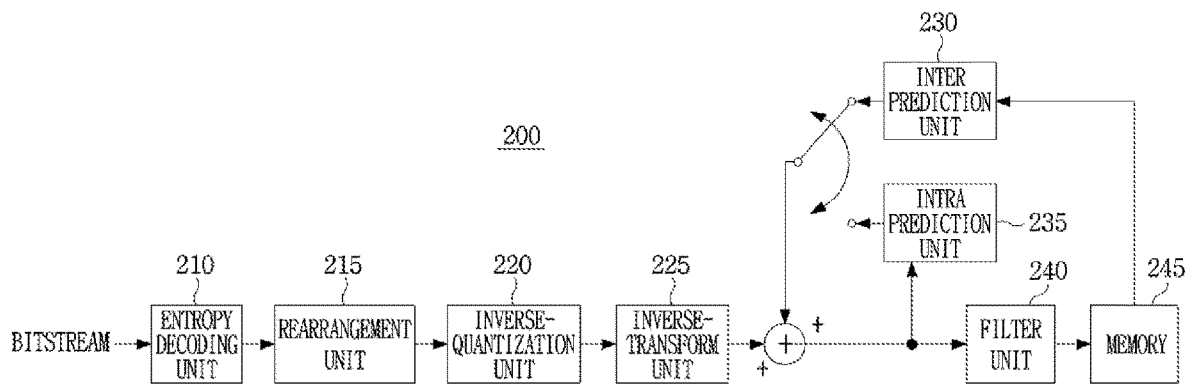
FIG. 2 is a block diagram showing an image decoding apparatus according to the present invention.

FIG. 2 is a block diagram showing an image decoding apparatus according to the present invention.

Referring to FIG. 2, the image decoder 200 may include an entropy decoding unit 210, a rearrangement unit 215, an inverse quantization unit 220, an inverse transform unit 225, a prediction unit 230, 235, and a filter unit 240, a memory 245.

When an image bitstream is input from the image encoder, the input bitstream may be decoded in a procedure opposite to that of the image encoder.

The entropy decoding unit 210 may perform entropy-decoding in a procedure opposite to that performed by entropy-encoding in the entropy encoding unit of the image encoder. For example, various methods corresponding to the method performed in the image encoder such as Exponential Golomb (CAVLC), Context-Adaptive Variable Length Coding (CAVLC), and Context-Adaptive Binary Arithmetic Coding (CABAC) may be applied.

The entropy decoding unit 210 may decode information related to intra prediction and inter prediction performed by the encoder.

The rearrangement unit 215 may perform rearrangement of the bitstream entropy-decoded by the entropy decoding unit 210 based on a rearrangement method of the encoding unit. The coefficients of a 1-dimensional vector form may be rearranged into coefficients of a 2-dimensional block form again.

The inverse quantization unit 220 may perform inverse quantization based on the quantization parameter provided by the encoder and the coefficients of the rearranged block.

The inverse transform unit 225 may perform inverse transform, that is, inverse DCT, inverse DST, and inverse KLT, corresponding to transforms performed by the transform unit, that is, DCT, DST, and KLT for the quantization results performed by the image encoder. The inverse transform may be performed based on the transmission unit determined by the image encoder. In the inverse transform unit 225 of the image decoder, a transform method (for example, DCT, DST, KLT) may be selectively performed according to a plurality of information such as a prediction method, a size of a current block, and a prediction direction.

The prediction units 230 and 235 may generate a prediction block based on prediction block generation related information provided by the entropy decoding unit 210 and previously decoded block or picture information provided by the memory 245.

As described above, when a size of the prediction unit and a size of the transform unit are the same in performing intra prediction in the same manner as in the image encoder, the intra prediction of the prediction unit may be performed based on pixels located on the left, the top-left and the top of the prediction unit. However, when the size of the prediction unit and the size of the transform unit are different in performing intra prediction, the intra prediction may be performed using a reference pixel based on the transform unit. In addition, the intra prediction using N×N division may be used only for the minimum coding unit.

The prediction units 230 and 235 may include a prediction unit determination unit, an inter prediction unit, and an intra prediction unit. The prediction unit determination unit may receive various information from the entropy decoding unit 210 such as prediction unit information, prediction mode information of an intra prediction method, and motion prediction related information of an inter prediction method, classify the prediction unit from the current coding unit, and determine whether the prediction unit performs inter prediction or intra prediction. On the other hand, if the motion prediction related information for the inter prediction is not transmitted, and instead, information indicating that the motion information is derived and used in the decoder side and information about a method used to derive the motion information is transmitted from the encoder 100, the prediction unit determination unit determines the prediction performance of the inter prediction unit 23 based on the information transmitted from the encoder 100.

The inter prediction unit 230 may perform inter prediction for a current prediction unit based on information included in at least one of a previous picture or a subsequent picture of the current picture including the current prediction unit, by using information required for inter prediction of the current prediction unit provided by the image encoder. In order to perform inter prediction, a motion prediction method of a prediction unit included in a coding unit may be determined among a skip mode, a merge mode, an AMVP mode, and an intra block copy mode. Alternatively, the inter prediction unit 230 may perform inter prediction by deriving motion information from information indicating that the motion information is derived and used in the decoder side and information on a method used to derive the motion information, provided by the image encoder.

The intra prediction unit 235 may generate a prediction block based on pixel information in the current picture. When the prediction unit is a prediction unit that has performed intra prediction, intra prediction may be performed based on intra prediction mode information of a prediction unit provided by an image encoder. The intra prediction unit 235 may include an adaptive intra smoothing (AIS) filter, a reference pixel interpolation unit, and a DC filter. The AIS filter is a part that performs filtering on the reference pixel of the current block and may be applied by determining whether to apply the filter according to the prediction mode of the current prediction unit. AIS filtering may be performed on a reference pixel of a current block by using prediction mode and AIS filter information of a prediction unit provided by an image encoder. When the prediction mode of the current block is a mode that does not perform AIS filtering, the MS filter may not be applied.

When the prediction mode of the prediction unit is the prediction unit that performs intra prediction based on the pixel value obtained by interpolating the reference pixel, the reference pixel interpolation unit may interpolate the reference pixel to generate a reference pixel of an integer pixel or less. When the prediction mode of the current prediction unit is a prediction mode in which a prediction block is generated without interpolating a reference pixel, the reference pixel may not be interpolated. The DC filter may generate a prediction block through filtering when the prediction mode of the current block is the DC mode.

The reconstructed block or picture may be provided to the filter unit 240. The filter unit 240 may include a deblocking filter, an offset correction unit, and an ALF.

Information about whether a deblocking filter is applied to a corresponding block or picture and information about whether a strong filter is applied or a weak filter is applied in applying the deblocking filter may be provided from a video encoder. In the deblocking filter of the video decoder, information related to the deblocking filter provided by the video encoder may be provided, and the video decoder may perform deblocking filtering on the corresponding block.

The offset correction unit may perform offset correction on the reconstructed image based on a type of offset correction and offset value information applied to the image during encoding. ALF may be applied to a coding unit based on information on whether to apply ALF, ALF coefficient information, and the like, provided by an encoder. This ALF information may be provided from a specific parameter set.

The memory 245 may store the reconstructed picture or block so that it can be used as a reference picture or a reference block, and may also provide the reconstructed picture to an output unit.

Figure 3:
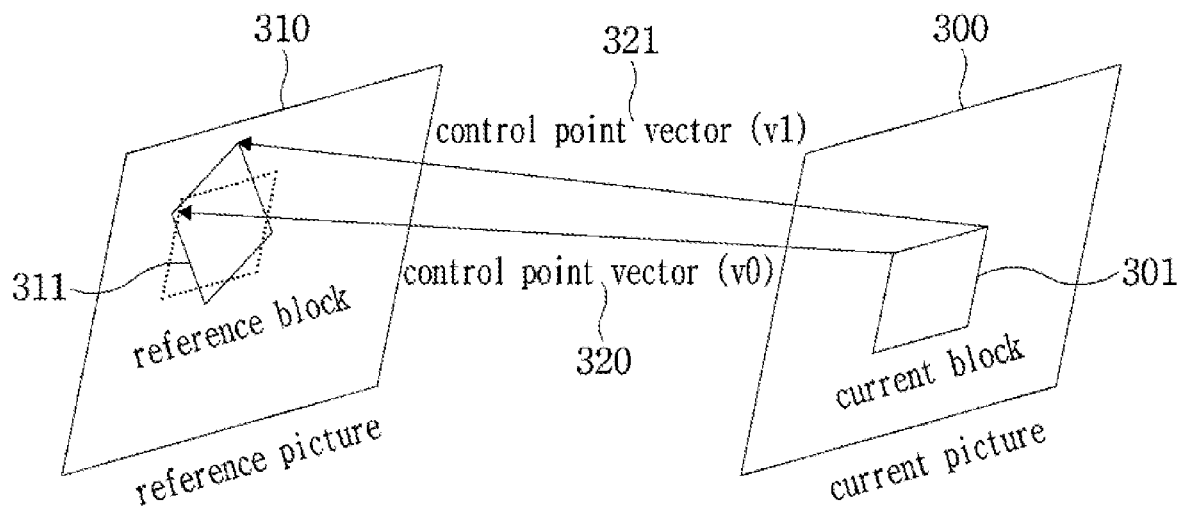
FIG. 3 illustrates a concept of performing inter prediction based on an affine model as an embodiment to which the present invention is applied.

FIG. 3 illustrates a concept of performing inter prediction based on an affine model as an embodiment to which the present invention is applied.

A general block-based prediction method supports motion prediction based on translational motion using a representative motion vector in units of blocks. In the present invention, a prediction method using an affine model is used to process various and complex motion models, such as rotation and zooming, which are difficult to process with a general block-based prediction method.

The affine model-based prediction is a method of predicting in an arbitrary shape by generating a motion vector corresponding to a point between a pixel of a current block and a pixel of a reference picture. However, the affine model-based prediction is not limited to prediction in units of pixels, and may be performed in units of subblocks by splitting the current block into a plurality of subblocks.

In the case of the above-described general block-based prediction method, the current block may perform block-wise motion prediction using one motion vector. In this case, the one motion vector may exist for each prediction direction, and the current block may mean a subblock generated by dividing one coding unit (CU) into a plurality as well as one coding unit.

In performing prediction for the current block 301 in the current picture 300 using the reference block 311 in the reference picture 310, a plurality of control points representing the current block (control point), the affine model-based prediction may perform motion prediction in an arbitrary form using control point vectors 320 and 321 corresponding to each control point. In the affine model-based prediction, a motion vector may be calculated in units of pixels of the current block 301 using a plurality of control point vectors, or a motion vector may be calculated in units of subblocks constituting the current block. Hereinafter, the affine model-based inter prediction method will be described in detail with reference to FIGS. 4 to 9.

Figure 4:
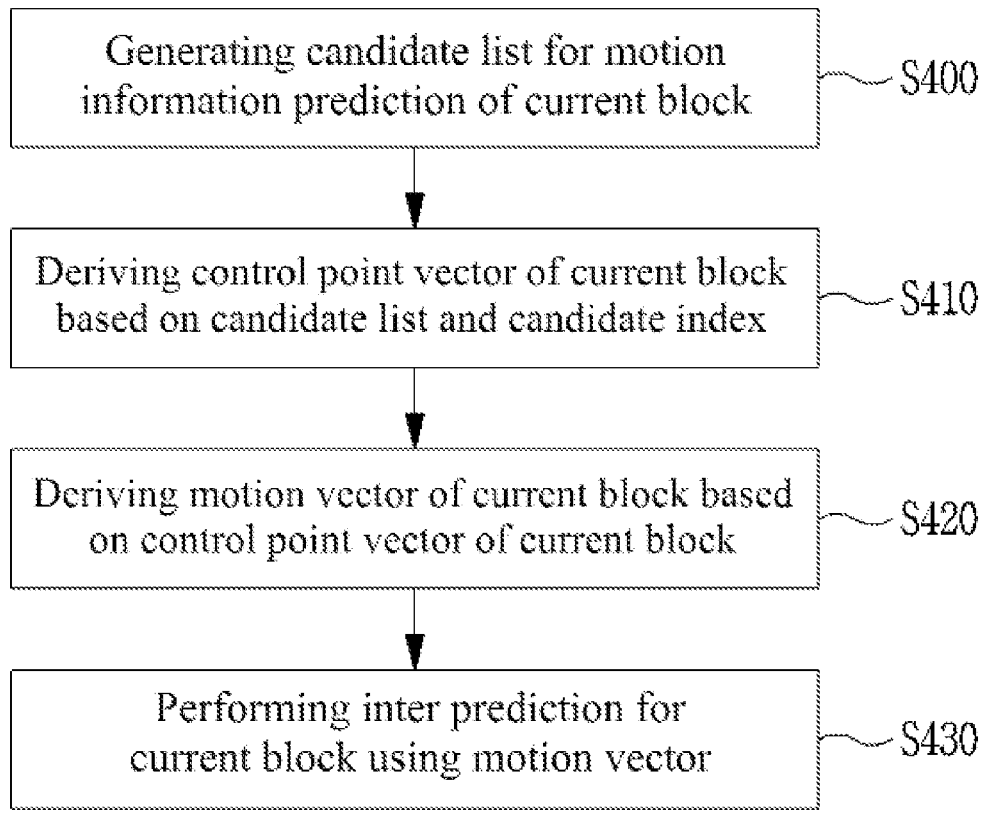
FIG. 4 illustrates an affine model-based inter prediction method as an embodiment to which the present invention is applied.

FIG. 4 illustrates an affine model-based inter prediction method as an embodiment to which the present invention is applied.

Referring to FIG. 4, a candidate list for predicting motion information of a current block may be generated (S400).

The candidate list may include one or more affine model-based candidates (hereinafter, referred to as affine candidate). The affine candidate may mean a candidate having a control point vector. The control point vector means a motion vector of the control point for the affine model, and may be defined for a corner position of a block (e.g., at least one of an top-left, an top-right, a bottom-left, or a bottom-right corner).

The affine candidate may include at least one of a spatial candidate, a temporal candidate, or a constructed candidate. Here, the spatial candidate may be derived from a vector of neighboring block spatially adjacent to the current block, and the temporal candidate may be derived from a vector of neighboring block temporally adjacent to the current block. Here, the neighboring block may mean a block encoded with an affine model. The vector may mean a motion vector or a control point vector.

A method of deriving a spatial/temporal candidate based on a vector of spatial/temporal neighboring blocks will be described in detail with reference to FIG. 5.

Meanwhile, the constructed candidate may be derived based on a combination between motion vectors of spatial/temporal neighboring blocks of the current block, which will be described in detail with reference to FIG. 6.

A plurality of affine candidates described above may be arranged in the candidate list based on a predetermined priority. For example, the plurality of affine candidates may be arranged in the candidate list in the order of a spatial candidate, a temporal candidate, and a constructed candidate. Alternatively, the plurality of affine candidates may be arranged in the candidate list in the order of a temporal candidate, a spatial candidate, and a constructed candidate. However, the present invention is not limited thereto, and also the temporal candidate may be arranged after the constructed candidate. Alternatively, some of the constructed candidates may be arranged before the spatial candidate, and the rest may be arranged after the spatial candidate.

The candidate list may further include a subblock-based temporal candidate. The motion information of the temporal candidate may be derived as a collocated block corresponding to a current block, which will be described in detail with reference to FIG. 7.

A control point vector of the current block may be derived based on the candidate list and the candidate index (S410).

The candidate index may mean an index that is coded to derive the control point vector of the current block. The candidate index may specify any one of a plurality of affine candidates included in the candidate list. The control point vector of the current block may be derived using the control point vector of the affine candidate specified by the candidate index.

For example, it is assumed that a type of the affine model of the current block is 4-parameter (i.e., when it is determined that the current block uses two control point vectors). In this case, when the affine candidate specified by the candidate index has three control point vectors, only two control point vectors (e.g., control point vector with Idx=0, 1) are selected from among the three control point vectors, and it can be set as a control point vector of the current block. Alternatively, the three control point vectors of the specified affine candidate may be set as the control point vectors of the current block. In this case, the type of the affine model of the current block may be updated to 6-parameter.

On the other hand, it is assumed that the type of the affine model of the current block is 6-parameter (i.e., when it is determined that the current block uses three control point vectors). In this case, when the affine candidate specified by the candidate index has two control point vectors, one additional control point vector may be generated, and the two control point vectors of the affine candidate and the additional control point vector may be set as the control point vectors of the current block. The additional control point vector may be derived based on at least one of two control point vectors of the affine candidate, size of a current/neighboring block, or location information of a current/neighboring block.

Alternatively, the two control point vectors of the specified affine candidate may be set as the control point vectors of the current block. In this case, the type of the affine model of the current block may be updated to 4-parameter.

A motion vector of the current block may be derived based on the control point vector of the current block (S420).

The motion vector may be derived in units of subblocks of the current block. For this, the current block may be partitioned into a plurality of N×M subblocks. Here, the N×M subblock may be in the form of a rectangle (N>M or N<M) or a square (N=M). Values of the N and the M may be 4, 8, 16, 32 or more. A method of deriving a motion vector in units of subblocks will be described in detail with reference to FIG. 8.

The motion vector derivation process may further include a process of applying a predetermined offset to the motion vector derived based on the control point vector. The offset may mean a vector for improving a pre-derived motion vector. The offset may be determined based on information on at least one of an absolute or a direction of the offset. The absolute may be an integer of 1, 2, 3, or more. The direction may include at least one of left, right, top, and bottom. Information on the absolute and/or direction of the offset may be encoded and signaled by an encoding apparatus. Alternatively, the absolute of the offset may be a predetermined fixed value in a decoding apparatus.

Inter prediction may be performed on the current block using the derived motion vector (S430).

Specifically, a reference block may be specified using the motion vector of the current block. The reference block may be specified for each subblock of the current block. The reference block of each subblock may belong to one reference picture. That is, subblocks belonging to the current block can share one reference picture. Alternatively, a reference picture index may be independently set for each subblock of the current block.

The reference block may be specified by applying a predetermined interpolation filter to the reference picture. The encoding/decoding apparatus can define n interpolation filters. Here, the n may be an integer of 1, 2, 3 or more. At least one of the n interpolation filters may have different filter attribute from the other. The filter attribute may include at least one of a filter tap size or a filter coefficient.

For example, the number of taps of a first interpolation filter may be p, and the number of taps of a second interpolation filter may be q. Here, p may be a natural number less than q, p may be a natural number less than 7 (e.g., 6, 5, 4), and q may be a natural number greater than 7 (e.g., 8, 9, 10).

Table 1 below is an example of filter coefficients of a 6-tap interpolation filter with p=6.

TABLE 1

| MV | Tap filter | | | | | |
|---|---|---|---|---|---|---|
| 0 | 0 | 0 | 64 | 0 | 0 | 0 |
| 1/16 | 1 | −3 | 63 | 4 | −2 | 1 |
| 1/8 | 1 | −5 | 62 | 8 | −3 | 1 |
| 3/16 | 2 | −8 | 60 | 13 | −4 | 1 |
| 1/4 | 3 | −10 | 58 | 17 | −5 | 1 |
| 5/16 | 3 | −11 | 52 | 26 | −8 | 2 |
| 3/8 | 2 | −9 | 47 | 31 | −10 | 3 |
| 7/16 | 3 | −11 | 45 | 34 | −10 | 3 |
| 1/2 | 3 | −11 | 40 | 40 | −11 | 3 |
| 9/16 | 3 | −10 | 34 | 45 | −11 | 3 |
| 5/8 | 3 | −10 | 31 | 47 | −9 | 2 |
| 11/16 | 2 | −8 | 26 | 52 | −11 | 3 |
| 3/4 | 1 | −5 | 17 | 58 | −10 | 3 |
| 13/16 | 1 | −4 | 13 | 60 | −8 | 2 |
| 7/8 | 1 | −3 | 8 | 62 | −5 | 1 |
| 15/16 | 1 | −2 | 4 | 63 | −3 | 1 |

In consideration of at least one of a block size or a prediction mode, any one of the aforementioned plurality of interpolation filters may be selectively used. Here, the block may mean a current block or a subblock of the current block. The prediction mode may mean a skip mode, a merge mode, an AMVP mode, an affine model-based prediction mode, a current picture reference mode, etc. The current picture reference mode may mean a mode in which the current block is predicted by referring to a pre-reconstructed region in the current picture to which the current block belongs.

For example, when the size of the current block (or a subblock of the current block) is less than or equal to a predetermined threshold size, the first interpolation filter may be used, otherwise, the second interpolation filter may be used. The threshold size may be defined as a block size in which at least one of a width and a height is 4, 8, or 16.

Alternatively, when the current block is encoded in a first prediction mode, the first interpolation filter may be applied, and if not, the second interpolation filter may be applied. Here, the first prediction mode may mean any one of the aforementioned prediction modes. For example, the first prediction mode may mean a prediction mode based on the affine model or the current picture reference mode.

Meanwhile, the derived motion vector may include at least one of an L0 motion vector or an L1 motion vector. When the motion vector includes L0 and L1 motion vectors, the decoding apparatus may perform unidirectional prediction by setting any one of the L0 and L1 motion vectors to 0.

The setting may be selectively performed in consideration of at least one of a block size or a prediction mode. Here, the block may mean a current block or a subblock of the current block. The prediction mode may mean a skip mode, a merge mode, an AMVP mode, an affine model-based prediction mode, a current picture reference mode, etc.

For example, if the size of the current block (or subblock of the current block) is less than or equal to a predetermined threshold size, unidirectional prediction may be performed by setting the L1 motion vector to 0, otherwise, Bidirectional prediction may be performed using L0 and L1 motion vectors. Here, the threshold size may be defined as a block size in which at least one of the width and height is 4, 8, or 16.

Alternatively, when the current block is encoded in a first prediction mode, unidirectional prediction may be performed by setting the L1 motion vector to 0, and otherwise, bidirectional prediction may be performed using the L0 and L1 motion vectors.

The specified reference block may be set as a prediction block of the current block. The current block may be reconstructed by adding a residual block to the prediction block. An in-loop filter may be applied to the reconstructed current block, which will be described with reference to FIG. 8.

The above-described embodiment may be applied in the same/similar manner to not only a merge mode but also other inter modes (e.g., AMVP mode, etc.). However, even when the current block is encoded in the merge mode or the other inter-picture mode, the affine model-based prediction may be selectively performed, which will be described with reference to FIG. 9.

Figure 5:
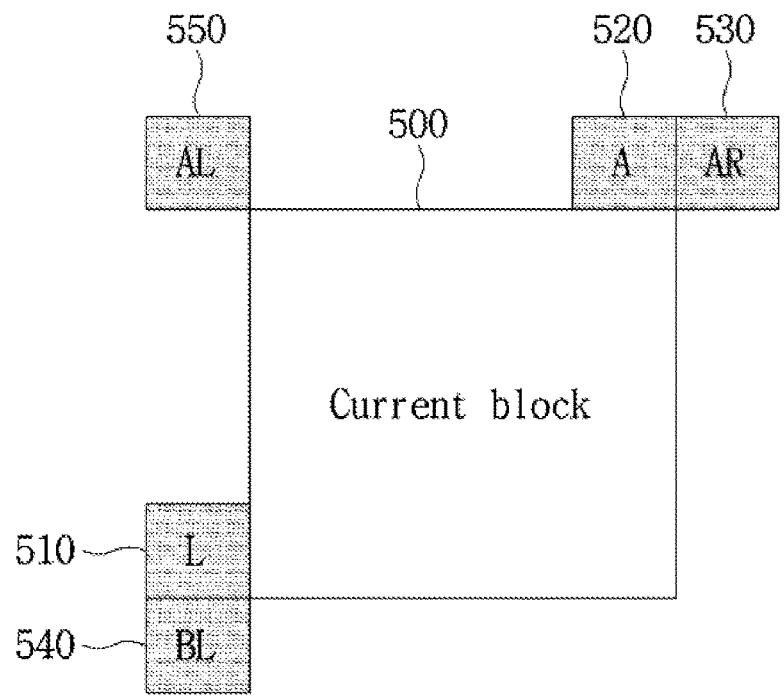
FIG. 5 illustrates a method of deriving an affine candidate from a control point vector of a spatial/temporal neighboring block as an embodiment to which the present invention is applied.

FIG. 5 illustrates a method of deriving an affine candidate from a control point vector of a spatial/temporal neighboring block as an embodiment to which the present invention is applied.

A width and a height of the current block 500 are cbW and cbH, respectively, and a position of the current block is (xCb, yCb). The width and height of spatial neighboring blocks 510-550 are nbW and nbH, respectively, and the positions of the spatial neighboring blocks are (xNb, yNb). The spatial neighboring block may include at least one of a left block 510, a below-left block 540, an above-right block 430, an above block 420, or an above-left block 450 of the current block. Alternatively, the spatial neighboring block may further include at least one of a block adjacent to the right side or a block adjacent to the below side of the above left block 450.

The spatial candidate may have n control point vectors (cpMV). Here, the n value may be an integer of 1, 2, 3, or more. The n value may be determined based on at least one of information on whether to be decoded in units of sub-blocks, information on whether the block is encoded with an affine model, or information on a type of the affine model (4-parameter or 6-parameter).

For example, according to the information, when the block is decoded in units of subblocks or is a block encoded by the affine model, the block may have two control point vectors. On the other hand, otherwise, the block may not perform the affine model-based prediction.

Alternatively, according to the information, when the block is a block encoded with the affine model and the type of the affine model is 6-parameter, the block may have three control point vectors. On the other hand, otherwise, the block may not perform the affine model-based prediction.

The above-described information may be encoded and signaled by an encoding device. Alternatively, all or part of the information may be derived from the decoding device based on the attribute of a block. Here, the block may mean a current block or a spatial/temporal neighboring block of the current block. The attribute may mean a size, a shape, a position, a partition type, an inter mode, a parameter related to a residual coefficient, etc. The inter mode may be a mode pre-defined in the decoding apparatus and may mean a merge mode, a skip mode, an AMVP mode, an affine model, an intra/inter combination mode, a current picture reference mode, etc. Alternatively, the value of n may be derived from the decoding device based on the above-described block attribute.

In this embodiment, the n control point vectors may be expressed as a first control point vector (cpMV[0]), a second control point vector (cpMV[1]), a third control point vector (cpMV[2]), . . . n-th control point vector (cpMV[n−1]).

For example, the first control point vector (cpMV[0]), the second control point vector (cpMV[1]), the third control point vector (cpMV[2]), and the fourth control point vector (cpMV[3]) may be respectively a vector corresponding to the position of the top-left sample, the top-right sample, the bottom-left sample, and the bottom-right sample. Here, it is assumed that the spatial candidate may have three control point vectors, and the three control point vectors may be arbitrary control point vectors selected from the first to n-th control point vector. However, the present invention is not limited thereto, and the spatial candidate may have two control point vectors, and the two control point vectors may be arbitrary control point vectors selected from the first to n-th control point vector.

Hereinafter, a method of deriving a control point vector of a spatial candidate will be described.

1. When a Boundary of the Current Block is not Located on a CTU Boundary

The first control point vector may be derived based on at least one of a first control point vector of a spatial neighboring block, a predetermined difference value, location information of a current block (xCb, yCb), or location information on the spatial neighboring block (xNb, yNb).

The number of the difference value may be 1, 2, 3 or more. The number of difference value may be variably determined in consideration of the above-described attribute of the block, or may be a fixed value pre-committed to the decoding apparatus. The difference value may be defined as a difference value between one of a plurality of control point vectors and the other. For example, the difference value may include at least one of a first difference value between the second control point vector and the first control point vector, a second difference value between the third control point vector and the first control point vector, a third difference value between and the fourth control point vector and the third control point vector, or a fourth difference value between the fourth control point vector and the second control point vector.

For example, the first control point vector may be derived as in Equation 1 below.

$$cpMvLX[0][0]=(\text{mvScale}Hor+dHorX^*(xCb-xNb)+dHorY^*(yCb-yNb))$$

$$cpMvLX[0][1]=(\text{mvScale}Ver+dVerX^*(xCb-xNb)+dVerY^*(yCb-yNb)) \quad \text{[Equation 1]}$$

In Equation 1, the variables mvScaleHor and mvScaleVer may mean a first control point vector of a spatial neighboring block, or a value derived by applying a shift operation by k to the first control point vector. Here, the k may be an integer of 1, 2, 3, 4, 5, 6, 7, 8, 9 or more. The variables dHorX and dVerX correspond to the x and y components of the first difference value between the second control point vector and the first control point vector, respectively. The variables dHorY and dVerY correspond to the x and y components of the second difference value between the third control point vector and the first control point vector, respectively. The above-described variable can be derived as in Equation 2 below.

$$\text{mvScale}Hor=CpMvLX[xNb][yNb][0][0]<<7$$

$$\text{mvScale}Ver=CpMvLX[xNb][yNb][0][1]<<7$$

$$dHorX=(CpMvLX[xNb+nNbW-1][yNb][1][0]-CpMvLX[xNb][yNb][0][0])<<(7-\log 2NbW)$$

$$dVerX=(CpMvLX[xNb+nNbW-1][yNb][1][1]-CpMvLX[xNb][yNb][0][1])<<(7-\log 2NbW)$$

$$dHorY=(CpMvLX[xNb][yNb+nNbH-1][2][0]-CpMvLX[xNb][yNb][2][0])<<(7-\log 2NbH)$$

$$dVerY=(CpMvLX[xNb][yNb+nNbH-1][2][1]-CpMvLX[xNb][yNb][2][1])<<(7-\log 2NbH) \quad \text{[Equation 2]}$$

The second control point vector may be derived based on at least one of the first control point vector of the spatial neighboring block, a predetermined difference value, location information of the current block (xCb, yCb), a block size (width or height), or location information of the spatial neighboring block (xNb, yNb). Here, the block size may mean the size of a current block and/or a spatial neighboring block. The difference value is as described in the first control point vector, and a detailed description thereof will be omitted. However, the range and/or number of difference values used in the process of deriving the second control point vector may be different from the first control point vector.

For example, the second control point vector may be derived as in Equation 3 below.

$$cpMvLX[1][0]=(\text{mvScale}Hor+dHorX^*(xCb+cbWidth-xNb)+dHorY^*(yCb-yNb))$$

$$cpMvLX[1][1]=(\text{mvScale}Ver+dVerX^*(xCb+cbWidth-xNb)+dVerY^*(yCb-yNb)) \quad \text{[Equation 3]}$$

In Equation 3, the variables mvScaleHor, mvScaleVer, dHorX, dVerX, dHorY, and dVerY are as described in Equation 1, and detailed descriptions thereof will be omitted.

The third control point vector may be derived based on at least one of the first control point vector of the spatial neighboring block, a predetermined difference value, location information of the current block (xCb, yCb), a block size (width or height), or location information of a spatial neighboring block (xNb, yNb). Here, the block size may mean the size of a current block and/or a spatial neighboring block. The difference value is as described in the first control point vector, and a detailed description thereof will be omitted. However, the range and/or number of difference values used in the process of deriving the third control point vector may be different from the first control point vector or the second control point vector.

For example, the third control point vector may be derived as in Equation 4 below.

$$cpMvLX[2][0]=(\text{mvScale}Hor+dHorX^*(xCb-xNb)+dHorY^*(yCb+cbHeight-yNb))$$

$$cpMvLX[2][1]=(\text{mvScale}Ver+dVerX^*(xCb-xNb)+dVerY^*(yCb+cbHeightyNb)) \quad \text{[Equation 4]}$$

In Equation 4, the variables mvScaleHor, mvScaleVer, dHorX, dVerX, dHorY, and dVerY are as described in Equation 1, and detailed descriptions thereof will be omitted. Meanwhile, through the above-described process, an n-th control point vector of a spatial candidate may be derived.

2. When the Boundary of the Current Block is Located on the CTU Boundary

The first control point vector may be derived based on at least one of a motion vector (MV) of a spatial neighboring block, a predetermined difference value, location information of a current block (xCb, yCb), or location information of a spatial neighboring block(xNb, yNb).

The motion vector may be a motion vector of a subblock located at the bottom of the spatial neighboring block. The subblock may be located at the leftmost, center, or rightmost among a plurality of subblocks located at the bottom of the spatial neighboring block. Alternatively, the motion vector may mean an average value, a maximum value, or a minimum value of motion vectors of a subblock.

The number of difference values may be 1, 2, 3 or more. The number of difference values may be variably determined in consideration of the above-described attribute of the block, or may be a fixed value pre-committed to the decoding apparatus. The difference value may be defined as a difference value between one of a plurality of motion vectors stored in units of subblocks in the spatial neighboring block and the other. For example, the difference value may mean a difference value between a motion vector of a bottom-right subblock and a motion vector of a bottom-left subblock of the spatial neighboring block.

For example, the first control point vector may be derived as in Equation 5 below.

$$cpMvLX[0][0]=(\text{mvScale}Hor+dHorX*(xCb-xNb)+dHorY*(yCb-yNb))$$

$$cpMvLX[0][1]=(\text{mvScale}Ver+dVerX*(xCb-xNb)+dVerY*(yCb-yNb)) \qquad \text{[Equation 5]}$$

In Equation 5, the variables mvScaleHor and mvScaleVer may mean a motion vector (MV) of the above-described spatial neighboring block or a value derived by applying a shift operation by k to the motion vector. Here, the k may be an integer of 1, 2, 3, 4, 5, 6, 7, 8, 9 or more.

The variables dHorX and dVerX correspond to the x and y components of a predetermined difference value, respectively. Here, the difference value means a difference value between the motion vector of the bottom-right subblock and the motion vector of the bottom-left subblock in the spatial neighboring block. The variables dHorY and dVerY can be derived based on the variables dHorX and dVerX. The above-described variable may be derived as in Equation 6 below.

$$\text{mvScale}Hor=MvLX[xNb][yNb+nNbH-1][0]<<7$$

$$\text{mvScale}Ver=MvLX[xNb][yNb+nNbH-1][1]<<7$$

$$dHorX=(MvLX[xNb+nNbW-1][yNb+nNbH-1][0]-MvLX[xNb][yNb+nNbH-1][0])<<(7-\log 2NbW)$$

$$dVerX=(MvLX[xNb+nNbW-1][yNb+nNbH-1][1]-MvLX[xNb][yNb+nNbH-1][1])<<(7-\log 2NbW)$$

$$dHorY=-dVerX$$

$$dVerY=dHorX \qquad \text{[Equation 6]}$$

The second control point vector may be derived based on at least one of a motion vector (MV) of the spatial neighboring block, a predetermined difference value, location information of a current block (xCb, yCb), a block size (width or height), or location information of a spatial neighboring block (xNb, yNb). Here, the block size may mean a size of the current block and/or the spatial neighboring block. The motion vector and the difference value are as described in the first control point vector, and a detailed description thereof will be omitted. However, the position of the motion vector used in the derivation process of the second control point vector, the range and/or number of the difference values may be different from the first control point vector.

For example, the second control point vector may be derived as in Equation 7 below.

$$cpMvLX[1][0]=(\text{mvScale}Hor+dHorX*(xCb+cbWidth-xNb)+dHorY*(yCb-yNb))$$

$$cpMvLX[1][1]=(\text{mvScale}Ver+dVerX*(xCb+cbWidth-xNb)+dVerY*(yCb-yNb)) \qquad \text{[Equation 7]}$$

In Equation 7, the variables mvScaleHor, mvScaleVer, dHorX, dVerX, dHorY, and dVerY are as described in Equation 5, and detailed descriptions thereof will be omitted.

The third control point vector may be derived based on at least one of a motion vector (MV) of the spatial neighboring block, a predetermined difference value, location information of a current block (xCb, yCb), a block size (width or height), or location information of a spatial neighboring block (xNb, yNb). Here, the block size may mean the size of the current block and/or the spatial neighboring block. The motion vector and the difference value are as described in the first control point vector, and a detailed description thereof will be omitted. However, the position of the motion vector used in the derivation process of the third control point vector, the range and/or the number of the difference values may be different from the first control point vector or the second control point vector.

For example, the third control point vector may be derived as in Equation 8 below.

$$cpMvLX[2][0]=(\text{mvScale}Hor+dHorX*(xCb-xNb)+dHorY*(yCb+cbHeight-yNb))$$

$$cpMvLX[2][1]=(\text{mvScale}Ver+dVerX*(xCb-xNb)+dVerY*(yCb+cbHeightyNb)) \qquad \text{[Equation 8]}$$

In Equation 8, the variables mvScaleHor, mvScaleVer, dHorX, dVerX, dHorY, and dVerY are as described in Equation 5, and detailed descriptions thereof will be omitted. Meanwhile, through the above-described process, an n-th control point vector of the spatial candidate may be derived.

The above-described process of deriving the affine candidate may be performed for each pre-defined spatial neighboring block. The pre-defined spatial neighboring block may include at least one of a left block, a below-left block, an above-right block, an above block, or an above-left block of the current block.

Alternatively, the process of deriving the affine candidate may be performed for each group of the spatial neighboring block. Here, the spatial neighboring block may be classified into a first group including a left block and a below-left block, and a second group including an above-right block, an above block, and an above-left block.

For example, one affine candidate may be derived from spatial neighboring block belonging to the first group. The derivation may be performed until an available affine candidate is found based on a predetermined priority. The priority may be in the order of left block->below-left block, or the reverse order. According to the priority, it is determined whether the spatial neighboring block in the first group is a block decoded through affine model-based prediction, and the first decoded block by the affine model-based prediction may be selected as the affine candidate.

Similarly, one affine candidate may be derived from spatial neighboring block belonging to the second group. The derivation may be performed until an available affine candidate is found based on a predetermined priority. The priority may be in the order of above-right block-> above block-> above-left block, or the reverse order. According to the priority, it is determined whether the spatial neighboring block in the second group is a block decoded through affine model-based prediction, and the first decoded block by the affine model-based prediction may be selected as the affine candidate.

The above-described embodiment can be applied in the same/similar manner to a temporal neighboring block. Here, the temporal neighboring block may be a block that belongs to a picture different from the current block, but at the same position as the current block. The co-located block may be a block including a position of an top-left sample of the current block, a center position, or a position of a sample adjacent to the bottom-right sample of the current block.

Alternatively, the temporal neighboring block may mean a block at a position shifted by a predetermined disparity vector from the block at the same position. Here, the disparity vector may be determined based on a motion vector of any one of the above-described spatial neighboring blocks of the current block.

Figure 6:
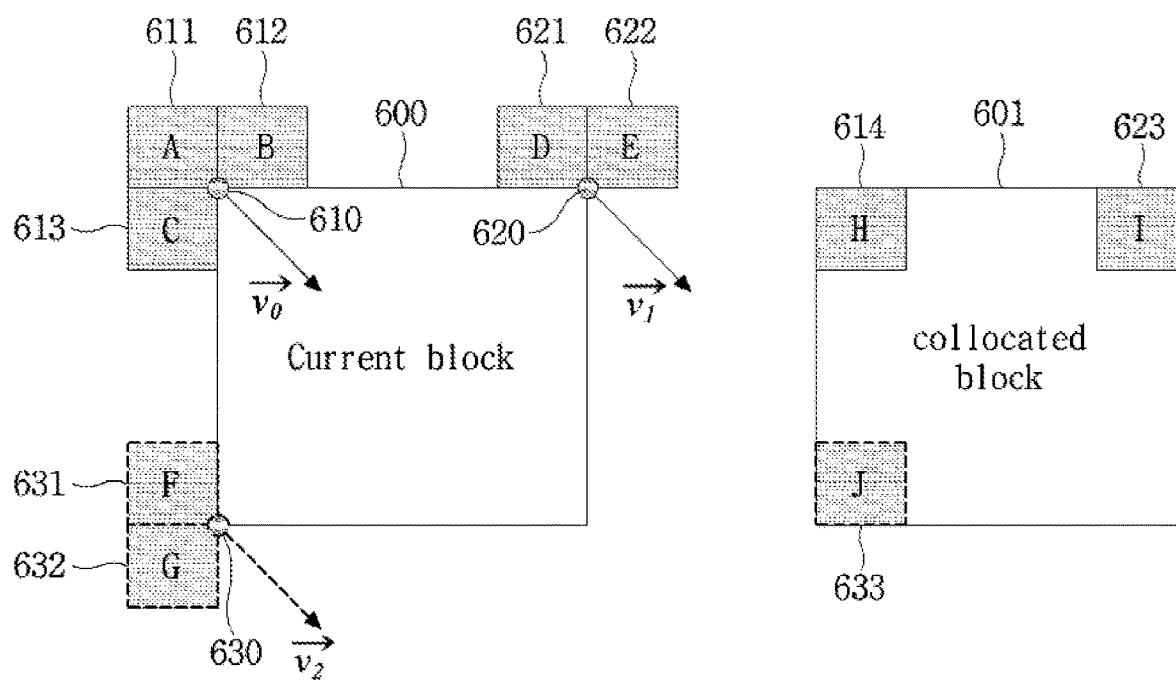
FIG. 6 illustrates a method of deriving a constructed candidate based on a combination of motion vectors of spatial/temporal neighboring block as an embodiment to which the present invention is applied.

FIG. 6 illustrates a method of deriving a constructed candidate based on a combination of motion vectors of spatial/temporal neighboring block as an embodiment to which the present invention is applied.

The constructed candidate of the present invention may be derived based on a combination of at least two of control point vectors corresponding to each corner of the current block (hereinafter, referred to as control point vectors (cpMVCorner[n])). Here, then may be 0, 1, 2, or 3.

The control point vector (cpMVCorner[n]) may be derived based on motion vector of spatial and/or temporal neighboring block. Here, the spatial neighboring block may include at least one of a first neighboring block (A, B, or C) adjacent to the top-left sample of the current block, a second neighboring block (D or E) adjacent to the top-right sample of the current block, or a third neighboring block (F or G) adjacent to the bottom-left sample of the current block. The temporal neighboring block is a block belonging to a picture different from the current block, and may mean a block at the same position as the current block (hereinafter, referred to as a fourth neighboring block (Col)). Here, the fourth neighboring block may mean a block (H, I, or J) including a position of an top-left sample, an top-right sample, or a bottom-left sample of the current block, or a block adjacent to the position of the bottom-right sample of the current block.

The first neighboring block may mean a neighboring block at the above-left (A), above (B), or left (C) of the current block. It is determined whether a motion vector of neighboring blocks A, B, and C are available according to a predetermined priority, and a control point vector may be determined using a motion vector of the available neighboring block. The availability determination may be performed until a neighboring block having an available motion vector is found. Here, the priority may be in the order of A->B->C. However, the present invention is not limited thereto, and may be in the order of A->C->B, C->A->B, B->A->C.

The second neighboring block may mean a neighboring block at the above (D) or the above-right (E) of the current block. Likewise, it is determined whether a motion vector of neighboring blocks D and E are available according to a predetermined priority, and a control point vector may be determined using a motion vector of the available neighboring block. The availability determination may be performed until a neighboring block having an available motion vector is found. Here, the priority may be in the order of D->E, or in the order of E->D.

The third neighboring block may mean a neighboring block on the left (F) or the below-left (G) of the current block. Likewise, it is determined whether a motion vector of a neighboring block is available according to a predetermined priority, and determine a control point vector using a motion vector of the neighboring block that is available. The availability determination may be performed until a neighboring block having an available motion vector is found. Here, the priority may be in the order of G->F, or in the order of F->G.

For example, a first control point vector (cpMVCorner[0]) may be set as a motion vector of the first neighboring block, and a second control point vector (cpMVCorner[1]) may be set as a motion vector of the second neighboring block. In addition, the third control point vector cpMVCorner[2] may be set as a motion vector of the third neighboring block. The fourth control point vector cpMVCorner[3] may be set as a motion vector of the fourth neighboring block.

Alternatively, the first control point vector may be derived using at least one motion vector of the first neighboring block or the fourth neighboring block, where the fourth neighboring block may be a block H including the position of the top-left sample. The second control point vector may be derived using at least one motion vector of the second neighboring block or the fourth neighboring block. Here, the fourth neighboring block may be a block I including the location of the top-right sample. The third control point vector may be derived using at least one motion vector of the third neighboring block or the fourth neighboring block. Here, the fourth neighboring block may be a block J including the position of the bottom-left sample.

Alternatively, any one of the first to fourth control point vectors may be derived based on the other. For example, the second control point vector may be derived by applying a predetermined offset vector to the first control point vector. The offset vector may be a difference vector between the third control point vector and the first control point vector or may be derived by applying a predetermined scaling factor to the difference vector. The scaling factor may be determined based on at least one of the width or height of the current block and/or the neighboring block.

Through a combination of at least two of the first to fourth control point vectors described above, K constructed candidates ConstK according to the present invention may be determined. The K value may be an integer of 1, 2, 3, 4, 5, 6, 7 or more. The K value may be derived based on information signaled by the encoding apparatus or may be a value pre-committed to the decoding apparatus. The information may include information indicating the maximum number of constructed candidates included in the candidate list.

Specifically, the first constructed candidate Const1 may be derived by combining the first to third control point vectors. For example, the first constructed candidate Const1 may have a control point vector as shown in Table 2 below. Meanwhile, only when the reference picture information of the first neighboring block is the same as the reference picture information of the second and third neighboring blocks, the control point vector may be configured as shown in Table 2. Here, the reference picture information may mean a reference picture index indicating a position of the reference picture in a reference picture list, or a picture order count (POC) value indicating an output order.

TABLE 2

| Idx | Control point vector |
| --- | --- |
| 0 | cpMvCorner[0] |
| 1 | cpMvCorner[1] |
| 2 | cpMvCorner[2] |

The second constructed candidate Const2 may be derived by combining the first, second, and fourth control point vectors. For example, the second constructed candidate Const2 may have a control point vector as shown in Table 3 below. Meanwhile, only when the reference picture information of the first neighboring block is the same as the reference picture information of the second and fourth neighboring blocks, the control point vector may be configured as shown in Table 3. Here, the reference picture information is as described above.

TABLE 3

| Idx | Control point vector |
| --- | --- |
| 0 | cpMvCorner[0] |
| 1 | cpMvCorner[1] |
| 2 | cpMvCorner[3] + cpMvCorner[1] − cpMvCorner[0] + cpMvCorner[3] + cpMvCorner[0] − cpMvCorner[1] |

The third constructed candidate Const3 may be derived by combining the first, third and fourth control point vectors. For example, the third constructed candidate Const3 may have a control point vector as shown in Table 4 below. Meanwhile, only when the reference picture information of the first neighboring block is the same as the reference picture information of the third and fourth neighboring blocks, the control point vector may be configured as shown in Table 4. Here, the reference picture information is as described above.

TABLE 4

| Idx | Control point vector | Control point vector |
| --- | --- | --- |
| 0 | cpMvCorner[0] | cpMvCorner[0] |
| 1 | cpMvCorner[3] + cpMvCorner[0] − cpMvCorner[2] | cpMvCorner[2] |
| 2 | cpMvCorner[2] | cpMvCorner[0] + cpMvCorner[3] − cpMvCorner[2] |

The fourth constructed candidate Const4 may be derived by combining the second, third, and fourth control point vectors. For example, the fourth constructed candidate Const4 may have a control point vector as shown in Table 5 below. Meanwhile, the configuration as shown in Table 5 may be limited only when the reference picture information of the second neighboring block is the same as the reference picture information of the third and fourth neighboring blocks. Here, the reference picture information is as described above.

TABLE 5

| Idx | Control point vector | Control point vector |
| --- | --- | --- |
| 0 | cpMvCorner[1] + cpMvCorner[2] − cpMvCorner[3] | cpMvCorner[2] |
| 1 | cpMvCorner[1] | cpMvCorner[3] |
| 2 | cpMvCorner[2] | cpMvCorner[3] + cpMvCorner[2] − cpMvCorner[1] |

The fifth constructed candidate Const5 may be derived by combining the first and second control point vectors. For example, the fifth constructed candidate Const5 may have a control point vector as shown in Table 6 below. On the other hand, only when the reference picture information of the first neighboring block is the same as the reference picture information of the second neighboring block, the control point vector may be configured as shown in Table 6. Here, the reference picture information is as described above.

TABLE 6

| Idx | Control point vector |
| --- | --- |
| 1 | cpMvCorner[0] |
| 2 | cpMvCorner[1] |

The sixth constructed candidate Const6 may be derived by combining the first and third control point vectors. For example, the sixth constructed candidate Const6 may have a control point vector as shown in Table 7 below. Meanwhile, only when the reference picture information of the first neighboring block is the same as the reference picture information of the third neighboring block, the control point vector may be configured as shown in Table 7. Here, the reference picture information is as described above.

TABLE 7

| Idx | Control point vector | Control point vector |
| --- | --- | --- |
| 1 | cpMvCorner[0] | cpMvCorner[0] |
| 2 | cpMvCorner[2] | cpMvCorner[1] |

In Table 7, cpMvCorner[1] may be a second control point vector derived based on the first and third control point vectors. The second control point vector may be derived based on at least one of the first control point vector, a predetermined difference value, or the size of the current/surrounding block. For example, the second control point vector may be derived as in Equation 9 below.

$$cpMvCorner[1][0]=(cpMvCorner[0][0]<<7)+\\((cpMvCorner[2][1]-cpMvCorner[0][1])<<(7+\\\text{Log }2(cbHeight/cbWidth)))$$

$$cpMvCorner[1][1]=(cpMvCorner[0][1]<<7)+\\((cpMvCorner[2][0]-cpMvCorner[0][0])<<(7+\\\text{Log }2(cbHeight/cbWidth))) \quad \text{[Equation 9]}$$

In the aforementioned K constructed candidates (ConstK), the K value does not limit the position or priority of the constructed candidates arranged in the candidate list.

In addition, all of the first to sixth constructed candidates may be included in the candidate list, or only some of the first to sixth constructed candidates may be included in the candidate list.

For example, when it is determined that the current block uses three control point vectors, only constructed candidates generated through a combination of three of the first to fourth control point vectors may be used. When it is determined that the current block uses two control point vectors, a constructed candidate generated through a combination of at least two of the first to fourth control point vectors may be used, or generated through only two combinations of the first to fourth control point vectors.

Alternatively, only a part of the constructed candidates may be included in the candidate list in consideration of the maximum number of affine candidates included in the candidate list. Here, the maximum number may be determined based on the maximum number information signaled by the encoding apparatus, or may be variably determined in consideration of the above-described attribute of the current block. In this case, the K value of the constructed candidate (ConstK) may mean the priority to be inserted into the candidate list.

Meanwhile, when a difference value between two control point vectors belonging to the constructed candidate is less than a predetermined threshold value, the constructed candidate may not be inserted into the candidate list. The difference value between the two control point vectors may be divided into a difference value in a horizontal direction and a difference value in a vertical direction. Here, the difference value in the horizontal direction may mean a difference value between the first control point vector 610 and the second control point vector 620, and the difference value in the vertical direction may mean a difference value between the first control point vector 610 and the third control point vector 630. The threshold value may mean 0 or a vector of a size pre-committed to the encoding/decoding device.

Figure 7:
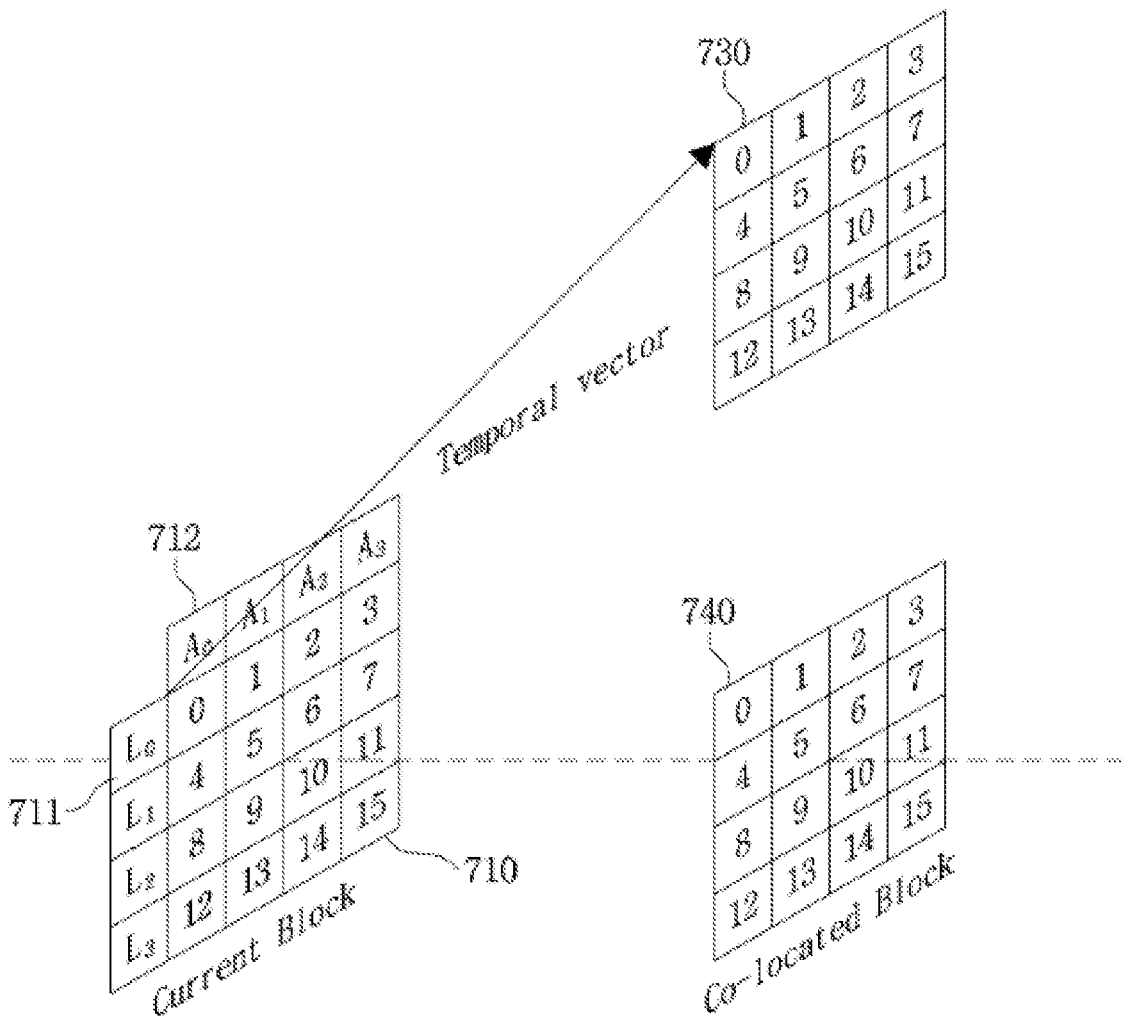
FIG. 7 illustrates a method of deriving motion information of a subblock based temporal candidate as an embodiment to which the present invention is applied.

FIG. 7 illustrates a method of deriving motion information of a subblock based temporal candidate as an embodiment to which the present invention is applied.

Motion information of a temporal candidate according to the present invention may be derived from motion information of a collocated block. The motion information may be derived in units of subblocks.

Here, the collocated block may be a block belonging to a picture different from the current block 710 (i.e., collocated picture), and may be a block 740 at the same position as the current block or a block 730 shifted by a temporal vector from the position of the current block. The temporal vector may be determined based on a motion vector of a spatial neighboring block of the current block. The spatial neighboring block may mean a block adjacent to at least one of the left, bottom left, top, top right, or top left of the current block. The temporal vector may be determined using only neighboring blocks at positions pre-committed to the encoding/decoding apparatus. For example, the pre-appointed position may be the left 711 or the top 712, or the left 711 and the top 712. When there are a plurality of neighboring blocks on the left, a block located at one of the lowest, the highest, or the center among the plurality of neighboring blocks may be used. When there is a plurality of neighboring blocks at the top, a block located at one of the leftmost, rightmost, or center of the plurality of neighboring blocks may be used.

In deriving a subblock-based temporal candidate, the current block and/or a collocated block may be divided into a plurality of subblocks.

Here, the subblock may have a fixed size/shape pre-committed in the encoding/decoding apparatus. For example, the subblock is represented by an N×M block, and values of N and M may be integers of 4, 8 or higher. The subblock may be a square (N=M) or a rectangle (N>M, N<M). May mean size. Alternatively, the encoding apparatus may encode and signal the information on the size/shape of the subblock, and the decoding apparatus may determine the size/shape of the subblock based on the signaled information.

Alternatively, the current block and/or the collocated block may be divided into a plurality of subblocks based on a predetermined number. Here, the number may be a fixed number pre-committed to the encoding/decoding apparatus, or may be variably determined in consideration of the block size/shape. Alternatively, the number may be determined based on number information signaled by the encoding device.

Hereinafter, a method of deriving motion information of a temporal candidate in units of subblocks will be described. The temporal candidate motion vector may be set as a motion vector stored for each subblock of the collocated block. The reference picture index of the temporal candidate may be set to a value (eg, 0) pre-defined in the encoding/decoding apparatus. Alternatively, the temporal candidate reference picture index may be set as a reference picture index of a collocated block or a reference picture index of a top left subblock among subblocks. Alternatively, like the motion vector, a reference picture index of a temporal candidate may be set as a reference picture index stored for each subblock.

However, when there is an unusable subblock among subblocks belonging to the collocated block, the motion vector of the unusable subblock may be replaced with a motion vector of an available subblock within the collocated block. Here, the available subblock may mean a block adjacent to any one of the left, right, top, or bottom of the non-available subblock. Alternatively, the available subblock may be a block at a position pre-committed to the encoding/decoding apparatus. For example, the pre-committed position may be the position of the bottom right subblock in the collocated block or the position of the subblock including the center position of the collocated block. The above-described subblock-based temporal candidate may be added to the candidate list only when the available subblock exists. Alternatively, the above-described subblock-based temporal candidate may be added to the candidate list only when the subblock of the pre-appointed position is available.

Figure 8:
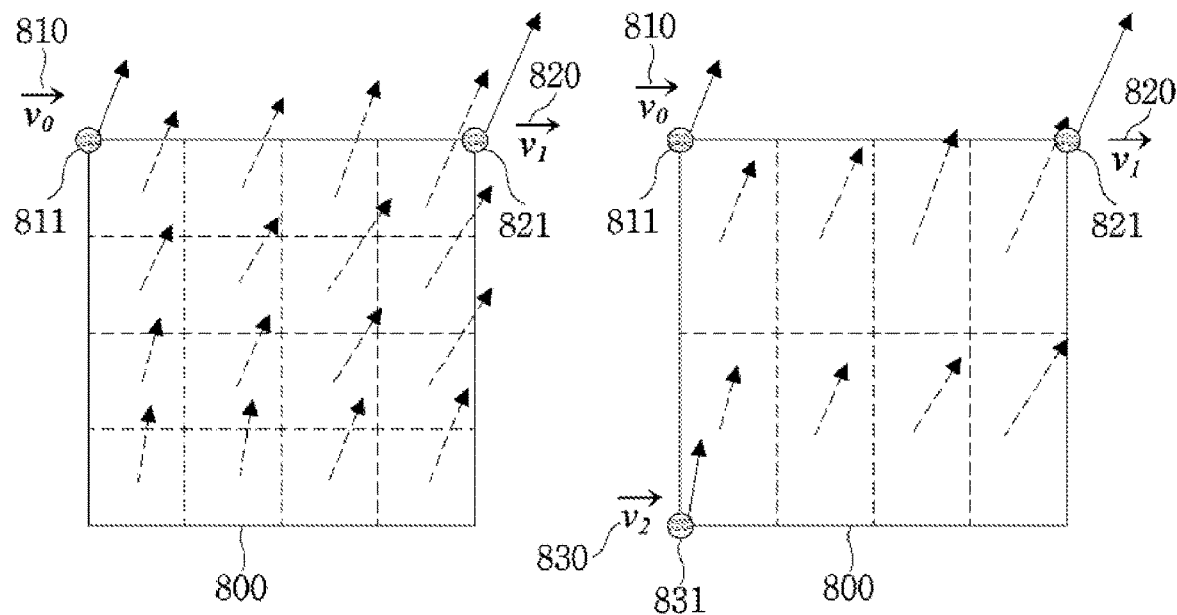
FIG. 8 illustrates a method of deriving a motion vector in units of subblocks as an embodiment to which the present invention is applied.

FIG. 8 illustrates a method of deriving a motion vector in units of subblocks as an embodiment to which the present invention is applied.

As described above, a motion vector of the current block may be derived using the control point vector of the current block. In this case, the current block is divided into a plurality of subblocks, and a motion vector may be derived in units of subblocks.

The size/shape of the subblock may be a fixed size/shape pre-defined in the decoding apparatus. For example, the size/shape of the subblock may be a square such as 4×4, 8×8, 16×16, or the like, or a rectangle such as 2×4, 2×8, 4×8, 4×16, etc. Alternatively, the subblock may be defined as a block in which the sum of the width and the height is 8, 12, 16 or more. Alternatively, the subblock may be defined as a block in which the product of the width and the height is an integer of 16, 32, 64 or more.

Alternatively, the size/shape of the subblock may be variably derived based on the attribute of the above-described block. For example, if the size of the current block is greater than or equal to a predetermined threshold size, the current block may be divided in units of a first subblock (e.g., 8×8, 16×16), otherwise, the current block may be divided in units of a second subblock (e.g., 4×4).

Alternatively, information on the size/shape of the subblock may be encoded and signaled by an encoding apparatus. The information indicates at least one of the size or shape of the subblock, which may be signaled at at least one level of a sequence, a picture, a tile group, a tile, a CTU.

Alternatively, the size/shape of the subblock may be calculated as in Equation 10 below by using the control point vector of the current block.

$$\begin{cases} K = clip3\left(4, w, \dfrac{w \times \text{mv\_precision}}{\max(\text{abs}(v_{1x} - v_{0x}), \text{abs}(v_{1y} - v_{0y}))}\right) \\ L = clip3\left(4, h, \dfrac{h \times \text{mv\_precision}}{\max(\text{abs}(v_{2x} - v_{0x}), \text{abs}(v_{2y} - v_{0y}))}\right) \end{cases} \quad \text{[Equation 10]}$$

As illustrated in FIG. 8, the control points representing the current block 800 may include a top left position 811 and a top right position 821. However, the present invention is not limited thereto, and the control point may include three points of the top left position 811, the top right position 821, and a bottom left position 831, or may further include a plurality of additional points.

When two control points 811 and 821 are used, the first control point vector 810 corresponding to the first control point 811, the second control point vector 820 corresponding to the second control point 821, and the subblock A motion vector for each subblock of the current block may be derived using at least one of the position (x, y) or the size of the current block (w or h). For example, the motion vector of each subblock may be derived as in Equation 11 below.

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases} \quad \text{[Equation 11]}$$

When three control points are used, A motion vector for each subblock of the current block may be derived using at least one of the first control point vector 810 corresponding to the first control point 811, the second control point vector 820 corresponding to the second control point 821, and the third control point 831 corresponding to the third control point vector 830, the position of the subblock (x, y), or the size of the current block (w or h). In this case, a difference vector between the second control point vector and the first control point vector may be used, and a difference vector between the third control point vector and the first control point vector may be used. The difference vector may be calculated for each of a horizontal direction (x-axis direction) and a vertical direction (y-axis direction).

Figure 9:
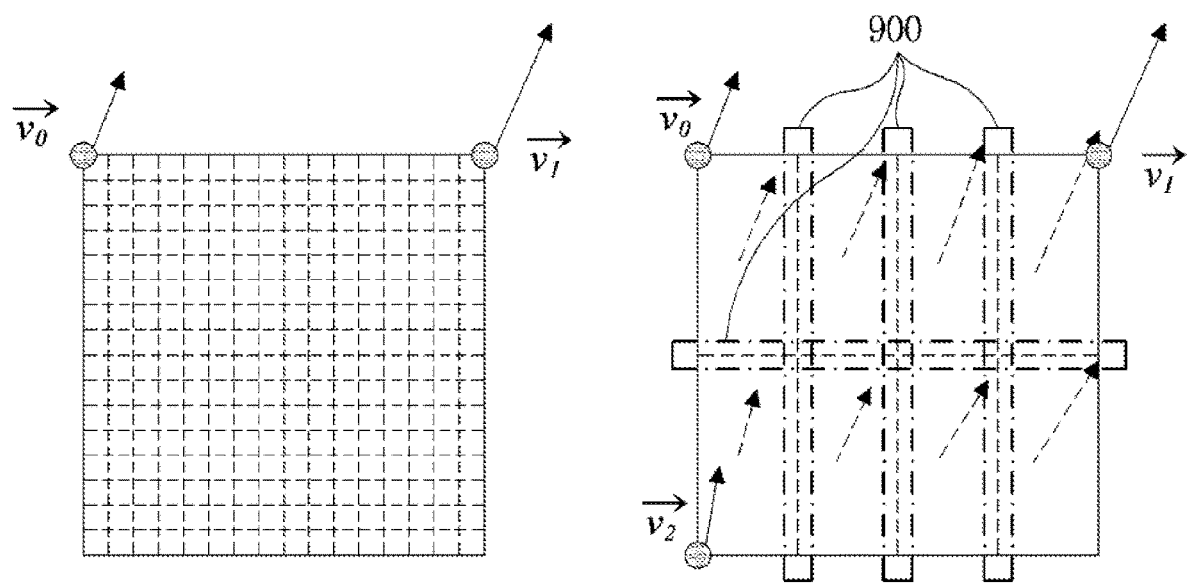
FIG. 9 illustrates a filtering method according to a unit for performing affine model-based prediction as an embodiment to which the present invention is applied.

FIG. 9 illustrates a filtering method according to a unit for performing affine model-based prediction as an embodiment to which the present invention is applied.

A filtering method may be determined in consideration of a unit for performing affine model-based prediction. The unit for performing prediction based on the affine model may be a pixel of a current block, a subblock composed of a plurality of pixels, or a current block. Here, the filter may include overlapped block motion compensation (OBMC), deblocking filter, sample adaptive offset (SAO), adaptive loop filter (ALF), etc.

For example, when prediction based on an affine model is performed on a pixel-by-pixel basis, at least one of the filters may not be performed at a pixel boundary. Alternatively, when prediction based on the affine model is performed in units of subblocks, at least one of the filters may be performed at the boundary 900 of the subblocks.

When the affine model-based prediction is performed on a subblock basis, a filter attribute applied to the boundary of the subblock may be determined differently from the filter attribute applied to the boundary of the current block. Here, the filter attribute may include at least one of a boundary strength (BS) value, a filter coefficient, the number of filter taps, and a filter strength.

For example, the BS value for the boundary of the subblock may be less than or equal to the BS value for the boundary of the current block. Alternatively, the number of filter taps p for the boundary of the subblock may be less than or equal to the number of filter taps q for the boundary of the current block. Here, p and q may be 1, 2, 3, or more. Alternatively, the filter strength for the boundary of the subblock may be smaller than the filter strength for the boundary of the current block. However, this is only an example. That is, the BS value for the boundary of the subblock may be greater than the BS value for the boundary of the current block. Alternatively, the number of filter taps p for the boundary of the subblock may be greater than the number of filter taps q for the boundary of the current block. Here, p and q may be 1, 2, 3, or more. Alternatively, the filter strength for the boundary of the subblock may be greater than the filter strength for the boundary of the current block.

Figure 10:
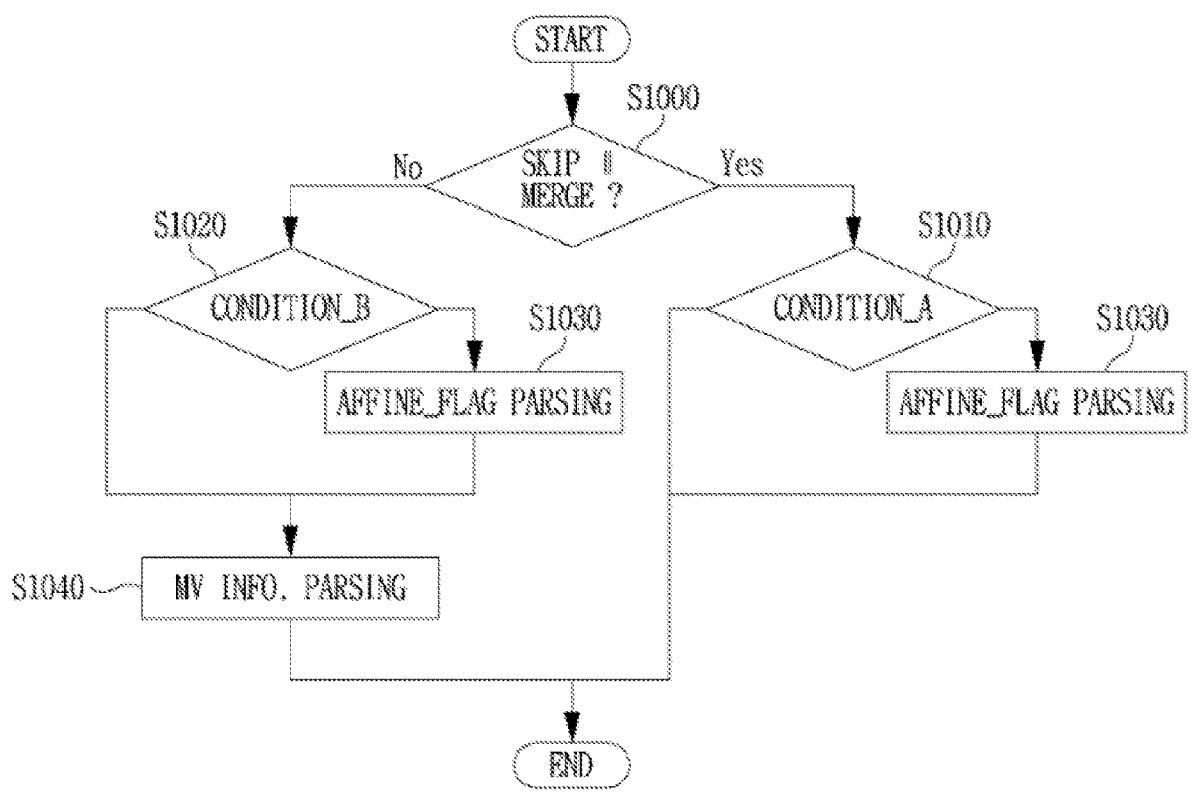
FIG. 10 illustrates a method of selectively using affine model-based prediction as an embodiment to which the present invention is applied.

FIG. 10 illustrates a method of selectively using affine model-based prediction as an embodiment to which the present invention is applied.

Referring to FIG. 10, whether a current block is a block encoded in a skip mode or a merge mode may be determined (S1000).

When the current block is a block encoded in the skip mode or the merge mode, whether at least one block of neighboring blocks of the current block is encoded by affine model-based prediction (condition A-1) may be determined (S1010).

Here, the neighboring blocks of the current block may be limited to spatially adjacent neighboring blocks, or may include all spatially/temporally adjacent neighboring blocks. Spatial/temporal neighboring blocks are as described above, and detailed descriptions thereof will be omitted.

In addition, whether a size of the current block is equal to or greater than a predetermined first threshold size (condition A-2) may be determined (S1010).

The first threshold size may be a pre-defined block size. For example, the threshold size may be defined as a block size in which the product of the width and height of the block is 64, a block size in which the sum of the width and height is 16, and a block size in which at least one of the width and height is 8, and the like. Alternatively, the encoding apparatus may encode and signal the information on the first threshold size, and the decoding apparatus may determine the first threshold size based on the signaled information. The information may be signaled at at least one level of a video sequence, a picture, a tile group, a tile, or a block.

When at least one of the above-described condition A-1 or condition A-2 is satisfied, whether a prediction based on an affine model is performed on the current block may be determined (S1030). In this case, whether the affine model-based prediction is performed may be signaled in the form of a flag. When the current block is in the skip mode or the merge mode, and the affine model-based prediction is performed, additional motion information other than information for affine model-based prediction may not be signaled.

The information for prediction based on the affine model may include a candidate index, and the candidate index may specify any one of a plurality of candidates belonging to a candidate list as described above. The candidate index may be used to determine a motion predictor of a current block from a candidate list.

When the current block is not a block encoded in the skip mode or merge mode, whether the size of the current block is equal to or greater than a predetermined second threshold (condition B) may be determined (S1020).

The second threshold size may be a pre-defined block size. For example, the threshold size may be defined as a block size in which the product of the width and height of the block is 64, a block size in which the sum of the width and height is 16, a block size in which at least one of the width and height is 8, and the like. Alternatively, the encoding apparatus may encode and signal the information on the second threshold size, and the decoding apparatus may determine the second threshold size based on the signaled information. The information may be signaled at at least one level of a video sequence, a picture, a tile group, a tile, or a block. However, the second threshold size may be set differently from the above-described first threshold size. For example, the second threshold size may be smaller than the first threshold size. Alternatively, the second threshold size may be larger than the first threshold size.

When condition B is satisfied, whether to perform affine model-based prediction on the current block may be determined (S1030). In this case, whether the affine model-based prediction is performed may be signaled in the form of a flag. When the current block is not in the skip mode or the merge mode and performs affine model-based prediction, additional motion information may be signaled. The additional motion information may include at least one of a motion vector difference, a reference picture index, and a weight for bidirectional prediction.

The additional motion information may include a candidate index, and the candidate index may specify any one of a plurality of candidates belonging to a candidate list as described above. The candidate index may be used to determine a motion predictor of the current block from a candidate list.

The methods according to the present invention may be implemented in the form of program commands that can be executed through various computer means and recorded in a computer-readable medium. The computer-readable medium may include program commands, data files, data structures, and the like alone or in combination. The program commands recorded on the computer-readable medium may be specially designed and configured for the present invention, or may be known and usable to those skilled in computer software.

Examples of computer-readable media may include hardware devices specially configured to store and execute program instructions, such as ROM, RAM, flash memory, etc. Examples of program instructions may include not only machine language codes such as those produced by a compiler, but also high-level language codes that can be executed by a computer using an interpreter, etc. The above-described hardware device may be configured to operate as at least one software module to perform the operation of the present invention, and vice versa.

In addition, the above-described method or apparatus may be implemented by combining all or part of its configuration or function, or may be implemented separately.

Although described above with reference to preferred embodiments of the present invention, those skilled in the art will variously modify and change the present invention within the scope not departing from the spirit and scope of the present invention described in the following claims.

INDUSTRIAL APPLICABILITY

The present invention may be used to encode/decode video signal.

The invention claimed is:

1. A method of decoding an image, comprising:
generating a candidate list including merge candidates for motion information prediction of a current block in the image, wherein the merge candidates comprise at least one of a plurality of affine candidates or a subblock-based temporal candidate;
deriving, in units of subblocks of the current block, a motion vector of the current block based on the candidate list and a candidate index, the candidate index specifying one of the merge candidates in the candidate list;
generating a prediction block of the current block by performing inter prediction for the current block using the motion vector; and
reconstructing the current block based on the prediction block,
wherein, in response to a case where a merge candidate specified by the candidate index is one of the plurality of the affine candidates, deriving the motion vector comprises:
deriving a control point vector of the current block based on the specified merge candidate; and
deriving the motion vector based on the control point vector of the current block,
wherein, in response to a case where the specified merge candidate is the subblock-based temporal candidate, a motion vector of each of subblocks belonging to the current block is derived using a motion vector of a subblock in a collocated block corresponding to the each subblock in the current block, and
wherein the subblocks belonging to the current block share one reference picture.

2. The method of claim 1, wherein the affine candidate includes at least one of a spatial candidate or a constructed candidate, and
wherein the spatial candidate is derived from a block encoded with an affine model among spatial neighboring blocks of the current block.

3. The method of claim 2, wherein the control point vector of the current block includes at least one of a first control point vector corresponding to a top left sample of the current block, a second control point vector corresponding to a top right sample of the current block, or a third control point vector corresponding to a bottom left sample of the current block.

4. The method of claim 3, wherein the control point vector of the spatial candidate is derived by considering whether a boundary of the current block is located on a boundary of coding tree block (CTU).

5. The method of claim 2, wherein the constructed candidate is determined based on a combination of motion vectors of neighboring blocks adjacent to the current block.

6. The method of claim 3, wherein, in response to the case where the specified merge candidate is the one of the plurality of the affine candidates, the motion vector of the current block is derived using at least one of the first control point vector, the second control point vector, a position of the subblock, or the size of the current block.

7. The method of claim 1, wherein generating the candidate list is selectively performed by considering at least one of a prediction mode of a neighboring block of the current block or a size of the current block.

8. The method of claim 1, wherein the collocated block belongs to a picture different from the current block, and
wherein the collocated block is representative of a block at a position shifted by a temporal vector from a position of the current block.

9. The method of claim 8, wherein the temporal vector is determined based on only a left neighboring block among spatial neighboring blocks adjacent to the current block.

10. The method of claim 2, wherein the candidate list is generated by adding the merge candidates in an order of the subblock-based temporal candidate, the spatial candidate, and the constructed candidate.

11. The method of claim 4, wherein, in response to a case where the boundary of the current block is not located on the boundary of the CTU, the control point vector of the spatial candidate is derived based on a control point vector of a spatial neighboring block, and
wherein, in response to a case where the boundary of the current block is located on the boundary of the CTU, the control point vector of the spatial candidate is derived based on a motion vector of the spatial neighboring block.

12. A method of encoding an image, comprising:
generating a candidate list including merge candidates for motion information prediction of a current block in the image, wherein the merge candidates comprise at least one of a plurality of affine candidates or a subblock-based temporal candidate;
deriving, in units of subblocks of the current block, a motion vector of the current block based on the candidate list;
generating a prediction block of the current block by performing inter prediction for the current block using the motion vector; and
generating a residual block of the current block based on the prediction block,
wherein a candidate index specifying one of the merge candidates in the candidate list is encoded into a bitstream,
wherein, in response to a case where the motion vector of the current block is derived based on one of the plurality of the affine candidates, deriving the motion vector comprises:
deriving a control point vector of the current block based on the one of the plurality of the affine candidates; and
deriving the motion vector based on the control point vector of the current block,
wherein, in response to a case where the motion vector of the current block is derived based on the subblock-based temporal candidate, a motion vector of each of subblocks belonging to the current block is derived using a motion vector of a subblock in a collocated block corresponding to the each subblock in the current block, and
wherein the subblocks belonging to the current block share one reference picture.

13. A non-transitory computer-readable medium for storing a bitstream generated by an image encoding method, the image encoding method comprising:
generating a candidate list including merge candidates for motion information prediction of a current block in the image, wherein the merge candidates comprise at least one of a plurality of affine candidates or a subblock-based temporal candidate;
deriving, in units of subblocks of the current block, a motion vector of the current block based on the candidate list;
generating a prediction block of the current block by performing inter prediction for the current block using the motion vector; and
generating a residual block of the current block based on the prediction block,
wherein a candidate index specifying one of the merge candidates in the candidate list is encoded into a bitstream,
wherein, in response to a case where the motion vector of the current block is derived based on one of the plurality of the affine candidates, deriving the motion vector comprises:
deriving a control point vector of the current block based on the one of the plurality of the affine candidates; and
deriving the motion vector based on the control point vector of the current block,
wherein, in response to a case where the motion vector of the current block is derived based on the subblock-based temporal candidate, a motion vector of each of subblocks belonging to the current block is derived using a motion vector of a subblock in a collocated block corresponding to the each subblock in the current block, and
wherein the subblocks belonging to the current block share one reference picture.

* * * * *